No. 765,030. PATENTED JULY 12, 1904.
E. T. MOORE.
COMBINED STARTER AND REGULATOR FOR ELECTRIC MOTORS.
APPLICATION FILED NOV. 10, 1903.
NO MODEL.
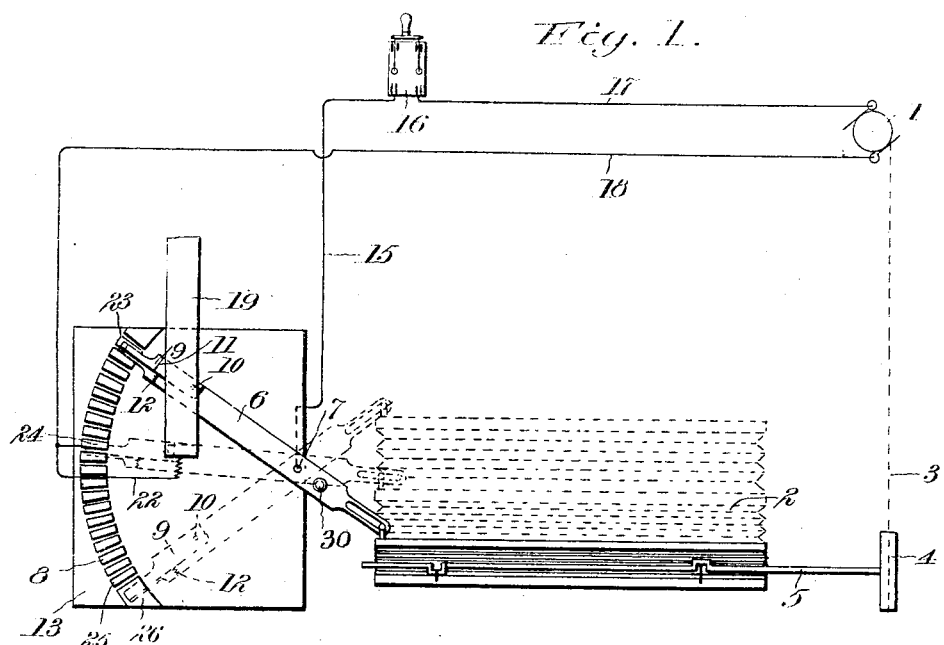
Fig. 1.
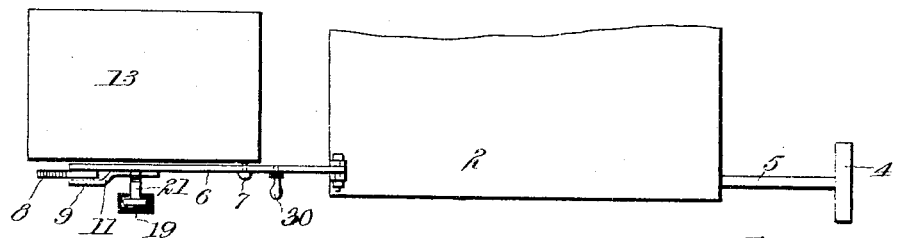
Fig. 2.
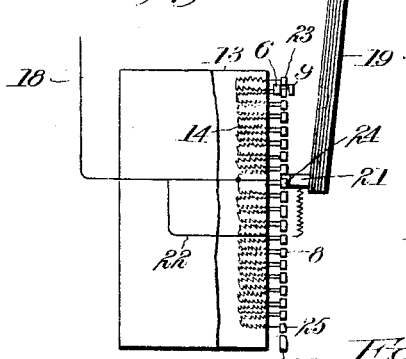
Fig. 3.
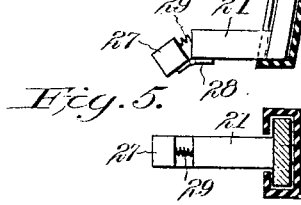
Fig. 4.
Fig. 5.
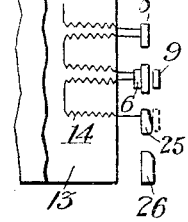
Fig. 7.
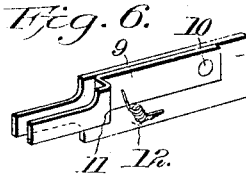
Fig. 6.
Witnesses
C. H. Walker.
E. A. Pincrel.
Inventor
Edward Talcott Moore
by Wm. W. Pincrel
Attorney No. 765,030.

Patented July 12, 1904.

UNITED STATES PATENT OFFICE.

EDWARD TALCOTT MOORE, OF NEWBURGH, NEW YORK.

COMBINED STARTER AND REGULATOR FOR ELECTRIC MOTORS.

SPECIFICATION forming part of Letters Patent No. 765,030, dated July 12, 1904.

Application filed November 10, 1903. Serial No. 180,614. (No model.)

*To all whom it may concern:*

Be it known that I, EDWARD TALCOTT MOORE, a citizen of the United States, residing at Newburgh, in the county of Orange and State of New York, have invented a certain new and useful Improvement in a Combined Starter and Regulator for Electric Motors, of which the following is a full, clear, and exact description.

The object of this invention is to provide means whereby an apparatus having a variable motion and operated by an electric motor may control automatically the supply of electric current to the motor, and thereby vary its speed and at the same time control its own action.

In illustration of the principle of the invention this specification is drawn to show how an organ-bellows actuated by an electric motor is made to automatically control the supply of electric current to the motor, so that the speed of the motor may be increased or diminished in proportion to the air-pressure or quantity of air required by the organist in playing; but it will be understood that the invention is not limited to this one instance of its adaptability.

In carrying out the invention there is interposed between the motor and the apparatus to be actuated a peculiar resistance device, which may be aptly termed a "combined" starter and regulator, comprising a resistance-box and an arm actuated by the apparatus in accordance with the amount of work required of it to put into the circuit more or less resistance, and thereby quicken or decrease the speed of the motor.

In the accompanying drawings, illustrating the invention, in the several figures of which like parts are similarly designated, Figure 1 is a diagrammatic elevation of an organ-bellows installation. Fig. 2 is a plan view omitting the wiring and motor. Fig. 3 is an end view of the resistance device. Fig. 4 is a longitudinal section of an auxiliary current-supply device; and Fig. 5 is a cross-section of this device, taken in the plane of line A B, Fig. 4. Fig. 6 is a perspective view of the contact end of the arm. Fig. 7 is an end elevation, on a larger scale, of the lower portion of the resistance device, showing the contact-arm approaching the dead-point.

The electric motor 1 may be of any approved and appropriate type, as also may be the bellows 2, and the two may be connected by a belt 3 from the motor, passed around a pulley 4 on the crank-shaft 5 of the bellows. The bellows has a slot-and-pin or other lost-motion connection with an arm 6, pivoted at 7 and extending thence over an arc of electrical contacts 8. The contact end of the arm is adapted to play over the rear of these contacts, and it has a yielding finger 9, adapted to play over the face of said contacts. This yielding finger 9 is pivoted at 10 to the arm, has an offset 11, and is supported parallel with the arm by a tension-spring 12. By this construction the finger 9 is caused to have a snap action as the arm passes from the last contact of the series to the dead-point in breaking the circuit. The contacts 8 are mounted upon a box 13 and wired up with suitable resistance devices, as at 14, excepting an intermediate contact, which has no resistance device applied to it, as will presently appear. As the bellows is inflated and deflated the arm moves over the contacts, and thus puts more or less resistance into the circuit. The arm is connected by wire 15 with a switch 16, and this in turn with the motor 1 by wire 17. The wire 18 connects the motor and the contacts and may be called the "feed-wire." An inclined guide 19 is arranged adjacent a central contact, and in it is arranged a slide 20, having a spring-held breakdown end 21. This slide is connected by wire 22 with the wire 18 independently of the resistance devices.

In operating organ-bellows by an electric motor it is necessary to vary the speed of the motor, so that it shall run at a high speed when the bellows is almost empty, at a decreasing speed while the bellows is filling, and stop when the bellows is full. In the ordinary installation a rheostat is usually employed to control the current entering the motor; but since this rheostat is located at some distance from the organ a second rheostat or starting-box is necessary to admit gradually to the first rheostat the necessary current, and this results in loss of time and other inconvenience to the organist. In the present invention this second rheostat is dispensed with and the switch alone is required to be operated to admit the current to the motor, after which the current is regulated by the automatic mechanism above described in the following manner: When it is desired to inflate the bellows, the switch 16 is closed, thus admitting current to the circuit above described and energizing the motor. It will be assumed, of course, that the bellows is empty or deflated and that the position of parts is as in full lines, Fig. 1. In this position the arm 6 has its contact end at the highest point and over the contact 23 of the arc of contacts 8, and since this contact-point 23 is the point of greatest resistance only a small quantity of current will enter the motor, and consequently the speed of the motor will be relatively slow; but as the bellows fills the arm 6 is actuated so as to cause its contact end to move downwardly, thus decreasing the resistance, and consequently increasing the speed of the motor until it reaches the contact having no resistance, which is the contact 24, located, say, about one-third of the way down the arc of contacts, so that all of the resistance is removed from the circuit. This results in giving to the motor its maximum speed. As soon as the maximum speed is attained the bellows continues to rise under inflation, the arm 6 continues to descend and brings into action the regulating portion of the rheostat, and more and more resistance is put into the current as said arm passes over the successive contacts from 24 to 25 and finally onto the dead-point 26. Thus it will be seen that the contacts from 23 to 24 constitute in their operation practically an automatic starting-box, while from the contact-point 24 to dead-point 26 constitute in their operation practically an automatic motor regulator or controller, and the two taken together constitute what is herein stated to be a combined starter and regulator for electric motors. As already stated, as the arm 6 descends from 23 to 24 the resistance is decreased and the speed increased, and as said arm descends from 24 to 26 the resistance is increased and the speed decreased. As that portion of the arm beneath the contact-points moves down toward the dead-point 26 the pivoted finger 9, which moves over the outer faces of the contact-points, remains on the contact-point 25 (see dotted-line position in Fig. 7) until the distance moved by the arm 6 is sufficient to cause the tension of the spring 12 to overcome the friction between the finger 9 and contact-point, when the finger 9 is suddenly and quickly pulled or snapped over onto the dead-point 26 by the force of the relaxing of the spring, and thereby the circuit is quickly broken and the arcing of the current prevented. Of course as soon as the circuit is broken the motor slows down or stops; but since the current is not cut out at the switch it follows that as the bellows begins to fall the arm 6 begins to rise and progressively cuts out the resistance again as the circuit is closed, thus allowing a progressively-increasing supply of current. It will be seen, therefore, that the bellows will always be kept at an average working condition of exhaustion and in a working condition until the circuit is broken permanently by operation of the switch.

It is sometimes necessary, especially where the bellows does not furnish enough air for "full organ," to augment the current-supply, so as to maintain the speed despite the upward movement of the arm 6, tending to increase the introduction of resistance into the circuit consequent upon the falling of the bellows. This maintenance of the current is effected by the auxiliary current-supply slide 21, which is an electric conductor moving in the insulated guide 19. This slide normally stands at about the level of the contact 24, and the arm 6 passes the slide by pushing down its breakdown end 27, as indicated in Fig. 4. This end 27 is hinged beneath at 28 and is connected with the body of the slide by a retractile spring, as 29, so that after the arm 6 passes below it the end 27 flies back and is interposed in the path of upward movement of arm 6, so that should the bellows deflate too rapidly the arm 6 will rise toward the contact 23, tending to increase the resistance, and thus decrease the speed of the motor and the supply of air; but since the arm meets the slide 21 in its rigid phase said slide will be carried up by it, and since said slide is connected by wire 22 with the feed-wire 18 the current will flow at full strength through wire 15, the arm 6, the slide 21, the wire 22, and wire 18, and thus the speed of the motor will be maintained, and consequently the bellows inflated sufficiently to give the desired pressure. Should the speed of the motor exceed the pressure required, the bellows continues to inflate and the downward movement of the arm 6 will permit the slide 21 to drop by its own weight and maintain the full supply of current until the arm 6 leaves the slide 21, when the current will cease to flow through the auxiliary current-supply connections, and the current regulating or controlling portion of the rheostat will be again brought into action. As soon as the pressure in the bellows is no longer required the switch 16 is opened and the bellows begins to deflate, and the upward movement of the arm 6 will carry the slide 21 with it until the said slide is drawn away from the arm and out of contact with it by reason of the inclination of its guide 19, and thus the arm will pass by the slide and be free to travel over the contacts and return to its original position of starting, and so slow down and stop the motor. The weight of the slide 21 is sufficient to carry it back again to its normal position opposite the full-current contact-point 24 after the arm has passed it. The resistance devices, as will thus appear, are divided into two series, one from 23 to 24, in which the decrease is downward, and the other from 24 to 25, where the increase is downward in proportion to the speed relatively to the power required of the machine being operated, and these two series are separated by a non-resistance or full-current contact where the speed is at its maximum and where it may be maintained by the automatic introduction into the circuit of the auxiliary current-supply device.

The combined starter and regulator may be used advantageously in any construction of machinery where the speed of an electric motor is to be controlled or where resistance is required to make a weaker current.

When the bellows is not used to automatically control the arm of the combined starter and regulator, the arm is provided with any suitable handle, as shown at 30, Figs. 1 and 3, by which it may be moved from the different contact-points by hand.

Obviously changes in the details of construction are permissible within the spirit and scope of the invention.

The rheostat or resistance device may be used for other purposes than in connection with bellows, when the current-supply arm might not be brought into action, but full current obtained at 24.

What I claim is—

1. The combination with an electric motor, of a combined starter and regulator therefor, comprising a resistance device adapted to place in circuit at the start a maximum resistance which gradually decreases as the speed of the motor increases until the maximum speed of motor is obtained, and an independent resistance device which thereafter gradually increases so as to slow down the speed of the motor in accordance with the work to be done.

2. A combined starter and regulator for electric motors, comprising two independent series of resistance devices, one of which decreases as the speed of the motor increases up to a maximum speed, and the other of which is brought into play as soon as the motor attains its maximum speed and increases to effect a decrease of the speed of the motor, and means traveling from one to the other of said series of resistance devices to bring the series successively into action.

3. A combined starter and regulator for electric motors, comprising two independent series of resistance devices, one of which decreases as the speed of the motor increases up to a maximum speed, and the other of which is brought into play as soon as the motor attains its maximum speed and increases to effect a decrease of the speed of the motor until a dead-point is reached and the circuit broken, and means traveling from one to the other of said series of resistance devices to bring the series successively into action.

4. A combined starter and regulator for electric motors, comprising two independent series of resistance devices, an intermediate full-current contact, the resistance devices increasing in opposite directions from the full-current contact, a motor in circuit with said resistance devices, a machine to be actuated by the motor, and a contact-arm arranged in the circuit and connected to move with the machine and adapted to introduce the resistance devices successively into circuit to vary the speed of the motor in accordance with the requirements of the machine.

5. A combined starter and regulator for electric motors, comprising two independent series of resistance devices decreasing as they approach one another, combined with a machine having a variable motion, an arm connected with said machine and partaking of its variable motion and electrically coöperating with the series of resistance devices, and an electric motor in circuit with said resistance devices and arm, and whose speed is automatically varied in accordance with the variable motion of the machine.

6. A combined starter and regulator for electric motors, comprising two independent series of resistances and an intermediate full-current contact, one series of resistances decreasing toward said contact, and the other series increasing from said contact and terminating in a dead-point, combined with a contact-arm, a machine having a variable motion to which the contact-arm is applied so as to partake of its variable motion, a motor connected in circuit with the resistances and contact-arm, and whose speed is governed by the variable motion of the machine, said contact-arm adapted to snap from the resistance in the second series to the dead-point without arcing.

7. In combination with an electric motor, a machine having a variable motion, a resistance device having a series of contacts terminating in a dead-point, a contact-arm operated by the machine and having a divided contact end, one member of which engages the contacts upon one side, and the other member of which is made yielding and adapted to frictionally engage the opposite side of the contacts so as to snap over the successive contacts and to the dead-point without arcing.

8. A combined starter and regulator for electric motors, comprising a series of resistance devices, a vibrating contact-arm, an electric motor in circuit with said resistance devices and arm, and adapted to supply current to the motor in accordance with the speed at which it is desired to run it, combined with an auxiliary current-supplying device adapted to be thrown into the circuit by the contact-arm independently of the resistance devices so as to maintain the maximum speed of the motor for any required time.

9. The combination with a variable-motion machine, a variable-speed motor, a resistance device in circuit with said motor, a vibrating arm also in said circuit and adapted to place more or less resistance in the circuit to vary the speed of the motor in accordance with the variable motion of the machine, and an auxiliary current-supply device arranged to coöperate with the said arm and pass the full strength of the current independently of the resistance device to the electric motor to maintain its maximum speed for any required length of time.

10. In combination with a series of resistance devices, an electric motor connected in circuit with said resistance devices, a vibrating contact-arm likewise in said circuit, a slide movable into and out of the path of movement of the said arm and having a breakdown end to permit the free passage of the arm past said slide in one direction and to resist passage of the said arm in the other direction and thereby cause said arm to carry said slide with it, and an electrical connection between said slide and the feed-wire.

11. In combination with a series of resistance devices, an electric motor in circuit with said resistance devices, a vibrating contact-arm likewise in said circuit, a slide, an inclined guide for said slide to cause it to move into and out of the path of movement of the arm, said slide having a breakdown end to permit the passage of the arm in one direction and to resist its passage in the other, and a wire connecting said slide with the feed-wire of the circuit so that the full strength of the current may be maintained in the motor for any required period.

12. A combined starter and regulator for electric motors, comprising a series of starting resistances and an independent series of regulating resistances and an intermediate full-current contact, a vibrating contact-arm coöperating with said starting and regulating resistances and said intermediate full-current contact, and an auxiliary full-current supply comprising a movable contact adapted to be engaged and carried by said arm in its movement over said starting resistances after said arm has reached said full-current contact.

In testimony whereof I have hereunto set my hand this 9th day of November, A. D. 1903.

EDWARD TALCOTT MOORE.

Witnesses:
C. C. TALCOTT,
C. W. BARTRUM.